(12) United States Patent
Komiyama et al.

(10) Patent No.: US 7,391,564 B2
(45) Date of Patent: Jun. 24, 2008

(54) INFRARED FOCUSING DEVICE

(75) Inventors: Susumu Komiyama, Tokyo (JP); Kenji Ikushima, Kanagawa (JP)

(73) Assignee: Japan Science and Technology Agency, Saitama (JP)

( * ) Notice: Subject to any disclaimer, the term of this patent is extended or adjusted under 35 U.S.C. 154(b) by 221 days.

(21) Appl. No.: 10/519,078

(22) PCT Filed: Apr. 22, 2003

(86) PCT No.: PCT/JP03/05104

§ 371 (c)(1),
(2), (4) Date: Dec. 23, 2004

(87) PCT Pub. No.: WO2004/003519

PCT Pub. Date: Jan. 8, 2004

(65) Prior Publication Data

US 2005/0254121 A1 Nov. 17, 2005

(30) Foreign Application Priority Data

Jun. 27, 2002 (JP) ............................. 2002-188508

(51) Int. Cl.
G02B 13/14 (2006.01)
(52) U.S. Cl. ........................................ 359/350; 359/356
(58) Field of Classification Search ....................... None
See application file for complete search history.

(56) References Cited

U.S. PATENT DOCUMENTS 5,018,865 A * 5/1991 Ferrell et al. ................. 356/600
5,121,256 A * 6/1992 Corle et al. ................... 359/664
5,939,709 A * 8/1999 Ghislain et al. ............. 250/216

(Continued)

FOREIGN PATENT DOCUMENTS

JP 05027180 A * 2/1993

(Continued)

OTHER PUBLICATIONS

Letters to Nature, vol. 399, pp. 134-137, 1999. Cited in the int'l. search report.

(Continued)

*Primary Examiner*—Stephone B. Allen
*Assistant Examiner*—Lee Fineman
(74) *Attorney, Agent, or Firm*—Westerman, Hattori, Daniels & Adrian, LLP.

(57) ABSTRACT

An infrared light condensing apparatus that focuses an infrared light of several tens microns in wavelength at a microfine area of submicron or less and also a near-field from a microfine area of submicron or less, and permits a scanning image to be obtained. It includes a solid immersion lens including a medium of high index of refraction for coupling an incident light or an outgoing light to an antenna, a measured specimen disposed on a base plane of the solid immersion lens, an antenna disposed away from the base plane at a distance ¼ of an effective wavelength of the light for causing the light to geometrically resonate therewith, a rod-like conductive probe having a sharply point end projecting from the antenna, and a position control means such as a triaxial XYZ mechanical stage for controlling the position of the probe with the intermediary of a cantilever.

9 Claims, 10 Drawing Sheets

U.S. PATENT DOCUMENTS 6,642,517 B1 * 11/2003 Ghislain et al. ............. 250/306
6,977,379 B2 * 12/2005 Zhang et al. ............. 250/341.1

FOREIGN PATENT DOCUMENTS

| | | |
|---|---|---|
| JP | 11-120610 | 4/1999 |
| JP | 11-352002 | 12/1999 |
| JP | 2001-189359 | 7/2001 |
| JP | 2001-236685 | 8/2001 |
| JP | 2002-33618 | 1/2002 |

OTHER PUBLICATIONS

Norihiko Hayazawa et al.; Elsevier, Chemical Physics Letters, vol. 335, pp. 369-374, 2001. Cited in the int'l. search report.

* cited by examiner (a)

(b)

(a)

(b)

INFRARED FOCUSING DEVICE

TECHNICAL FIELD

The present invention relates to an apparatus for condensing infrared light or microwave into a microfine area or for collecting infrared light or microwave emitted from a microfine area, which apparatus is herein referred to as an "infrared light condensing apparatus".

BACKGROUND ART

Combining geometrical-optical lenses in any way does not allow condensing a light into an area as extremely small as one half of its wavelength because of a diffraction limit of the light. It is then not possible either to pick up selectively a light emitted from an area as extremely small as one half of its wavelength. However, light has not only waves to propagate as described by the Maxwell's equations but also a near field that exists only extremely near the surface of an object. If a probe having a sharply pointed tip whose diameter is as small as less than the diffraction limit is used to bring this pointed tip into extremely close proximity to the surface of an object, there can then be created a near-field coupling between them to bring about a near field on the object surface, also permitting such a near field from an object to be taken as a light propagating. Using this method allows an optical image of an object to be observed at a resolution less than the diffraction limit and further the nature of matter such as Raman scattering to be measured at a resolution less than the diffraction limit.

In the past, however, there has been no technique available to control positioning a probe having a tip as sharp as less than the diffraction limit and to control the relationship in position between the probe tip and a measured object at a resolution less than the diffraction limit, and for this reason the near-field could hardly be applied.

In recent years, as represented by the atomic force microscope (AFM) it has become possible to control positioning a probe whose diameter is on an atomic size level and to control the relationship in position between the tip of the probe and an object to be measured three-dimensionally at a resolution less than an interatomic distance, thus spreading the use of the near-field applied techniques.

In the near-field applied techniques, however, that utilize light into and out of an extremely small area and therefore entail a signal that is extremely small in intensity, obtaining any information that is meaningful requires that light incident be condensed into a microfine area very efficiently and that a near field in such a microfine area be collected very efficiently, and namely calls for a system that is extremely high in light condensing efficiency. Further, obtaining a near-field image for a specimen requires that any light condensing positions be scanned at a resolution less than the diffraction limit.

The conventional near-field application techniques have the problem that they can scan light condensing positions but are low in light condensing efficiency or that they are high in light condensing efficiency but cannot scan light condensing positions, there being no apparatus which can be put to practical use by being excellent in light condensing efficiency and at the same time capable of scanning at a sufficiently high position resolution. Mention is made below of further details of the difficulties met by the prior art.

One of the near-field application techniques is a scattering-type scanning near-field optical microscope abbreviated as s-SNOM. This is an apparatus that is designed to cause a light of long wavelength such as a microwave to be condensed into a microfine area of sub-microns or less in size and an infrared light or microwave emitted from a microfine area of sub-microns or less in size to be collected or condensed. It utilizes a near-field coupling brought about between the sharply pointed tip of a small electric conductor and an object to be measured to perform a variety of measurements at a resolution less than the optical diffraction limit.

FIG. 8 illustrates the operating principles of such a microscope and shows the s-SNOM in a conceptual view as it condenses an infrared light at an AFM cantilever coated with an electric conductor. See literature: B. Knoll and F. Keilmann, Nature 399 (1999), issued 13 May 1999.

An infrared light 701 is incident from the external free space on an electric conductor 703 coated on a cantilever 702, then concentrating as a near-field at a tip 704 of the electric conductor 703. This near-field is coupled with a region, which is adjacent to the tip 704, on a specimen 706 mounted on a specimen support table 705. And inversely the near-field of the specimen 706 is coupled with and thereby transmitted to the tip 704 of the electric conductor 703 which then acting as an antenna emits it as an infrared light 707 into the external free space. Here, both the incident and outgoing infrared lights 701 and 707 are condensed by usual optical lenses (not shown). According to this apparatus, moving the cantilever 702 to let it scan allows an image by the entire near-field for the small specimen 706 to be observed at a resolution less than the diffraction limit.

However, since the proportion at which the infrared light 701 is coupled to the antenna 703 is proportional to factor ($\in_o/\in_s$) where $\in_o$ and $\in_s$ are the dielectric constants of the external space and the specimen support substrate 705, respectively, and $\in_o < \in_s$, the efficiency of the electric conductor 703 as an antenna is rather low. Likewise, the near-field from the small specimen 706 largely is coupled to the specimen support substrate 705 high in dielectric constant and comes to be emitted in its large part into the interior of the specimen support substrate 705 with only its reduced part emitted in the form of the infrared light 707. Thus, this system has the problem that the efficiency at which to condense an incident infrared light and the efficiency at which to condense a near-field from a specimen as an outgoing infrared light, namely its light condensing efficiency is low.

Another near-field application technique in the prior art is next shown.

FIG. 9 illustrates a method wherein light is made incident from the side of a specimen support substrate to obtain Raman scattering light. See literature: H. Hayazawa et al., Chem. Phys. Lett. 355 (2001) 369, issued 2 May 2001. An incident light 801 is condensed by a usual optical lens 802 and then past a substrate 805 coated with oil 803 and a thin film of silver 804 is focused on a specimen 806 whereupon a near-field by the focused light is intensified by surface plasmon polariton brought about and excited at a tip 809 of a cantilever 808 coated with an electric conductor 807. And similarly, Raman scattering light 810 from the specimen 806 intensified by the surface plasmon polariton brought about and excited at a tip 809 is taken out and then past the substrate 805 and the oil 803 is condensed by the lens 802. According to this method, scanning the cantilever 808 allows observing a Raman scattering scanning image of the specimen 806 at a resolution less than the diffraction limit.

In this method, however, the geometrical size of an electric conductor 807 as a whole is not taken into consideration, thereby leaving the electric conductor 807 less functioning as an antenna. Moreover, its function as an antenna is restricted by a screening or shielding effect exerted by the silver coating 804 on the specimen support substrate 805. Thus, lacking an adequate light focusing capability, the system is low in the efficiency at which to convert the near-field from the small specimen 806 into the outgoing light 810. To wit, the system has the problem that its light condensing efficiency is low.

By the way, in the field of far-infrared techniques there is known an efficient light condensing method for a microfine absorber in a far-infrared region. FIG. 10 is a conceptual view illustrating such an efficient light condensing method conventionally known for a microfine absorber in a far-infrared region. See literature: "Infrared and Millimeter Waves, Volume 10", Millimeter Components and Techniques, Part II, Chapter 1 (1983), ed. by Academic Press Inc. An incoming light 901 is incident into a solid immersion lens made of dielectric 902 and condensed on a planar dipole antenna or planar slot antenna 903 lying at its focal position. Further, the incident light condensed on the antenna is caused to geometrically resonate by the antenna and focused onto a small far-infrared absorber 904 disposed at the center of the antenna. According to this method in which a far-infrared light is caused to geometrically resonate by an antenna, it is possible to absorb the far-infrared light efficiently and at due sensitivity. Consequently, if a specimen to be measured is disposed in place of the far-infrared absorber 904 at a position at which it is disposed, then it is possible to take out the near-field 905 efficiently.

In this method, however, in which the planar dipole antenna or planar slot antenna 903 is fixed onto the solid immersion lens 902, it is not possible to move the light focusing position for scanning.

Thus, although there have already been systems designed to condense a light at a microfine area smaller than its diffraction limit or to take up a near-field from a microfine area smaller than its diffraction limit and then to condense it, e.g., to condense an infrared light whose wavelength is several tens microns or more at an area as microfine as sub-microns or less or to take out a near-field from an area as microfine as sub-microns or less and then to condense it, these conventional systems have the problem that they are low in light condensing efficiency or otherwise are incapable of scanning such a microfine position of light condensing, or light taking up.

DISCLOSURE OF THE INVENTION

It is, accordingly, an object of the present invention to provide an infrared light condensing apparatus that is capable of condensing an infrared light whose wavelength is several tens microns or more at an area as microfine as sub-microns or less efficiently and is likewise capable of taking up a near-field from an area as microfine as sub-microns or less and then to condense it and that is at the same time capable of repositioning such an area, thus capable of scanning such a microfine position of light condensing or light taking up In order to achieve the first object mentioned above there is provided in accordance with the present invention in a first aspect thereof an infrared light condensing apparatus, characterized in that it comprises: a solid immersion lens for accepting an incident light or emitting an outgoing light, the said solid immersion lens having a base plane on which a specimen is to be disposed; an antenna having a probe disposed away from a base plane of the said solid immersion lens at a distance not more than ¼ of an effective wavelength of the light; a holder means for retaining the said antenna; and a position control means for controlling the position of a tip of the said probe by means of the said holder means, whereby operating the said position control means allows:

the incident light to concentrate as a near-field at a desired position of the specimen on the base plane of the said solid immersion lens or a near-field from a desired position of the specimen to be converted into a propagating wave corresponding thereto and then the propagating wave to be emitted as the said outgoing light from the said solid immersion lens.

Specifically, the said solid immersion lens is composed of a medium that is low in absorption coefficient and large in dielectric constant for wavelengths of the said incident or outgoing light, while the distance between the said antenna and the base plane of the said solid immersion lens is less than ¼ of the effective wavelength of the light. This is to cause an incident light propagating in a medium of high dielectric constant to be efficiently coupled to an antenna and to cause an outgoing light to be emitted from an antenna into a medium of high dielectric constant, both of which characterizes an antenna enhanced in efficiency.

To wit, coupling of an incident or an outgoing light to an antenna in a medium of high dielectric constant is made better in efficiency than in a free space (vacuum or air) by a factor of $(\epsilon_s/\epsilon_o)^{3/2}$ where $\epsilon_s$ and $\epsilon_o$ are dielectric constants of the medium and free space, respectively. See literature: "Infrared and Millimeter Waves, Volume 10", Millimeter Components and Techniques, Part II, Chapter 1 (1983), ed. by Academic Press Inc. For example, when the solid immersion lens is composed of silicon ($\epsilon_s=12.8\ \epsilon_o$), gallium ($\epsilon_s=12.5\ \epsilon_o$), germanium ($\epsilon_s=16\ \epsilon_o$) or the like, the improvement in efficiency reaches several tens times over in the free space.

Thus, a first feature of the present invention lies in coupling an incident or outgoing light to an antenna in a medium of high dielectric constant to enhance the light condensing efficiency of the antenna.

Also, the said antenna mentioned above may specifically be made of an electric conductor having a length that is half the effective wavelength of the incident or outgoing light to bring the incident or outgoing light into geometrical resonance with the antenna. Then, the incident light can be condensed and the outgoing light can be emitted, both extremely efficiently. Here, the term "effective wavelength" refers to a wavelength defined by $\lambda_{\mathit{eff}}=\lambda/[\epsilon_o+\epsilon_s]^{1/2}$ where $\epsilon_o$ is dielectric constant of vacuum, $\epsilon_s$ is dielectric constant of the solid immersion lens and λ is vacuum wavelength. Further, the said probe specifically may have its tip that is a sharply pointed edge of a rod-like electric conductor having a radius of curvature less than a diffraction limit of the incident or outgoing light and may be configured to project from the said electric conductor towards the specimen. Then, it is made possible to concentrate a near-field in a microfine area less than the light diffraction limit on the specimen and also to probe and pick up a near-field in a microfine area less than the light diffraction limit on the specimen. Thus, it is a second feature of the present invention to use an antenna that brings about geometrical resonance to enhance the light condensing efficiency of an incident or outgoing light.

Also, specifically the said holder means may comprise an arm and said position control means may comprise a triaxial XYZ mechanical stage. This permits the triaxial XYZ mechanical stage to be operated with the arm to three-dimensionally control the relationship in position between the probe tip and the specimen surface at a resolution less than the diffraction limit of the incident or outgoing light.

Also, specifically the said holder means may alternatively comprise a cantilever having a rear face reflecting an incident laser light and the said position control means may then be responsive to a change in angle of reflection of the laser light at the cantilever rear face in an arrangement as well known with the conventional AFM or the like, thereby permitting the relationship in position between the probe tip and the specimen surface to be controlled three-dimensionally at a further enhanced resolution less than the diffraction limit of the incident or outgoing light.

Also, if the position control means is operated to move the specimen for its scanning over a distance within a range of one half of the effective wavelength, there can in no case be the focal point of the solid immersion lens dislocated out of the antenna. It is therefore possible to convert an incident light into a near-field and then to concentrate it at a desired position or to convert a near-field at a desired position to an outgoing light and then to take out it, without lowering the due light condensing efficiency. It is therefore a third feature of the present invention to make it possible to scan a specimen while maintaining the light condensing efficiency high.

The present invention provides in a second aspect thereof an infrared light condensing apparatus characterized in that it comprises: a solid immersion lens for accepting an incident light or emitting an outgoing light; an antenna disposed on a base plane of the said solid immersion lens; a holder means for retaining a specimen adjacent to the said antenna; a position control means for controlling the position of the said holder means, whereby operating the said position control means allows:

the incident light to concentrate as a near-field at a desired position of the specimen retained by the said holder means or a near-field from a desired position of the specimen to be converted into a propagating wave corresponding thereto and then the propagating wave to be emitted as the said outgoing light from the said solid immersion lens.

The solid immersion lens may here again be composed of a medium that is low in absorption coefficient and large in dielectric constant for wavelengths of the incident or outgoing light, thereby permitting the incident or outgoing light to be coupled to the antenna in the medium of high dielectric constant to enhance its light condensing efficiency.

Also, specifically the said antenna may be a planar dipole antenna or a planar slot antenna disposed on a base plane of the said solid immersion lens in a region of its focal position. The said planar dipole antenna may be a bowtie antenna made of a pair of generally triangular electric conductors whose apexes are opposed to each other at a small distance less than a diffraction limit of the incident or outgoing light, the bowtie antenna having a total length that is one half of an effective wavelength of the incident or outgoing light. The said planar slot antenna may be a bowtie antenna made of an electric conductor having a pair of generally triangular windows formed therein whose apexes are opposed to each other at a small distance less than a diffraction limit of the incident or outgoing light, the bowtie antenna having a total length that is one half of an effective wavelength of the incident or outgoing light.

According to this makeup, an incident light is allowed to geometrically resonate with a planar dipole or slot antenna to generate a near-field and can be concentrated at a microfine area on a specimen efficiently. Alternatively, it is made possible to convert a near-field from a specimen into a propagating wave and take it out efficiently. Further, adjusting the essentially triangular configuration allows impedance-matching to further enhance the efficiency.

Also, specifically the said holder means may comprise an arm and said position control means may comprise a triaxial XYZ mechanical stage. This permits the triaxial XYZ mechanical stage to be operated with the arm to three-dimensionally control the relationship in position between the probe tip and the specimen surface at a resolution less than the diffraction limit of the incident or outgoing light.

Also, specifically the said holder means may alternatively comprise a cantilever having a rear face reflecting an incident laser light and the said position control means may then be responsive to a change in angle of reflection of the laser light at the cantilever rear face in an arrangement as well known with the conventional AFM or the like, thereby permitting the relationship in position between the probe tip and the specimen surface to be controlled three-dimensionally at a further enhanced resolution less than the diffraction limit of the incident or outgoing light.

Operating the position control means in this way to cause a desired position of a specimen retained by a holder means to be brought proximal to a focal position of a planar dipole or slot antenna allows concentrating an incident light as a near-field at the desired position of the specimen or picking up a near-field at the desired position of the specimen and converting it into a propagating wave to emit the latter as an outgoing light into the solid immersion lens medium.

The infrared light condensing apparatus according to the second aspect of the present invention is designed to move the specimen to obtain its scanning image while the infrared light condensing apparatus according to the first aspect of the invention is designed to move the antenna to scan the specimen for obtaining its scanning image.

While the first infrared light condensing apparatus of the invention has its resolution determined by the curvature of the probe tip, the apparatus according to the second aspect of the invention has the feature that its resolution is determined by a microfine area positioned at the center of the bowtie antenna, whose shape and surface area and any other geometric parameter can readily be varied by a particular design of the bowtie antenna. The bowtie antenna, which can be readily made up, e.g., by forming a pattern metal film on the base plane of a solid immersion lens, makes it possible to build up an apparatus with a resolution optimal to a particular specimen to be measured and a particular purpose of measurement.

BRIEF DESCRIPTION OF THE DRAWINGS

The present invention will better be understood from the following detailed description and the drawings attached hereto showing certain illustrative forms of implementation of the present invention. In this connection, it should be noted that such forms of implementation illustrated in the accompanying drawings hereof are intended in no way to limit the present invention but to facilitate an explanation and understanding thereof. In the drawings.

BEST MODES FOR CARRYING OUT THE INVENTION

Figure 1:
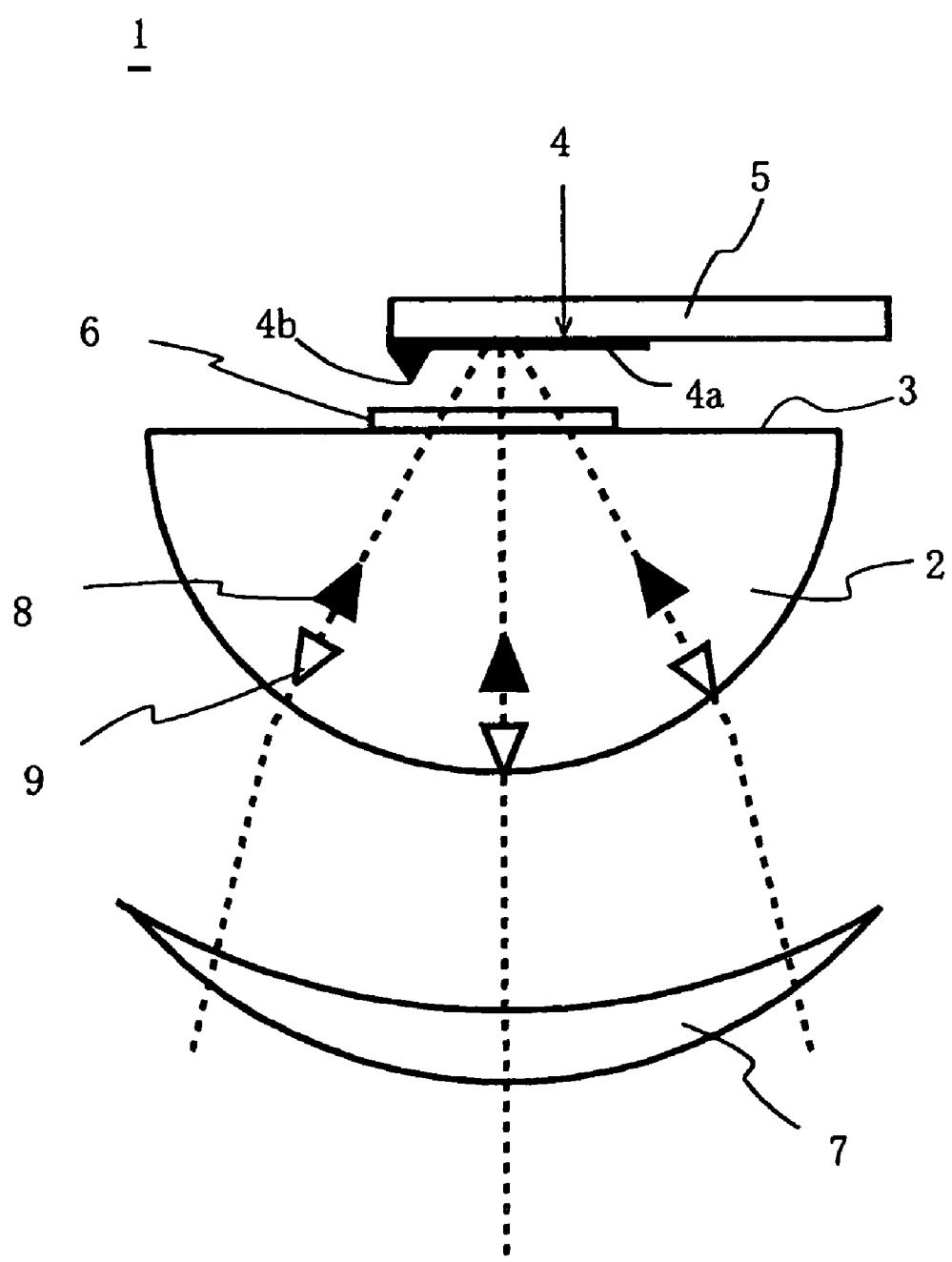
FIG. 1 is a schematic view illustrating an infrared light condensing apparatus that represents a first form of implementation of the present invention.

Hereinafter, the present invention will be described in detail with reference to forms of implementation thereof illustrated in the drawing figures.

Figure 2:
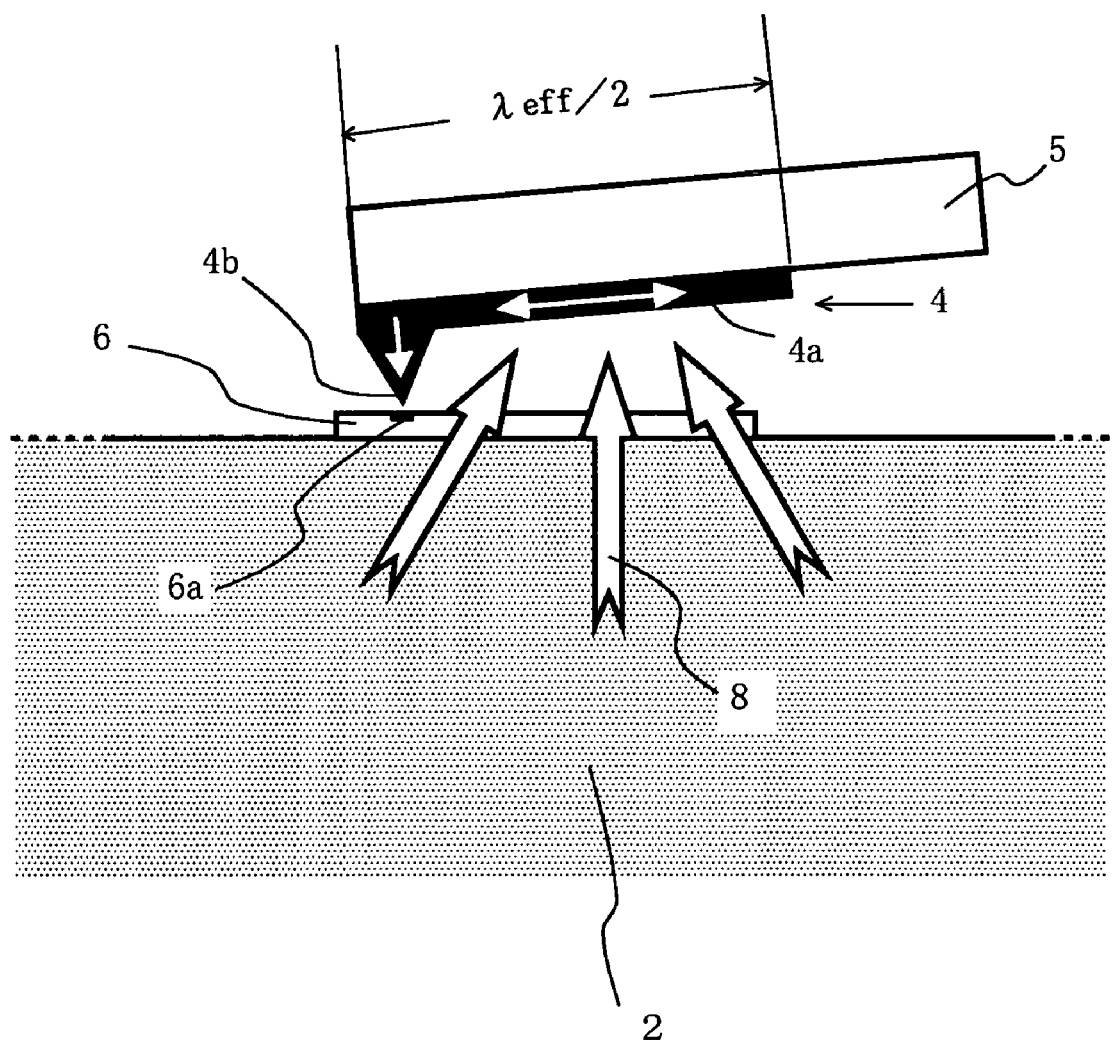
FIG. 2 is an enlarged view of an essential part of the apparatus shown in FIG. 1 for illustrating an operation thereof.

FIG. 1 is a diagram illustrating an infrared light condensing apparatus according to a first form of implementation of the present invention, and FIG. 2 is an enlarged view of an essential part of the apparatus shown in FIG. 1 for illustrating an operation thereof. The apparatus of the invention indicated by reference character 1 comprises a solid immersion lens 2, an antenna 4 spaced apart at a distance from a base plane 3 of the solid immersion lens 3, a cantilever 5 that holds the antenna 4 thereon, and a position control unit (not shown) for controlling the position of the cantilever 5. The antenna 4 as shown enlarged in FIG. 2 is made of an electric conductor 4a having a length that is one half of an effective wavelength $\lambda_{\mathit{eff}}$ of a light and a probe 4b projecting from the electric conductor 4a towards the base plane 3. Here, the effective wavelength $\lambda_{\mathit{eff}}$ is a wavelength defined by $\lambda_{\mathit{eff}} = \lambda / [\epsilon_o + \epsilon_s]^{1/2}$ where $\epsilon_o$ is dielectric constant of vacuum, $\epsilon_s$ is dielectric constant of the solid immersion lens and $\lambda$ is vacuum wavelength. On the other hand, the probe 4b is either itself electrically conductive or coated on its surface with an electric conductor and is made electrically integral with the electric conductor 4a. The probe 4b is here a rod-like electric conductor having a sharply pointed edge with its radius of curvature as small as submicron or less. Each part of the antenna 4 is disposed away from the base plane 3 of the solid immersion lens 2 at a distance within $\lambda_{\mathit{eff}}/4$. A specimen 6 to be measured is disposed on the base plane 3 of the solid immersion lens 2 in a region of its center.

The cantilever 5 is controlled in position by a conventional control means as well known, e.g., with the AFM. For example, if an amount of bending of the cantilever 5 due to an atomic force between surface atoms of the tip of the probe 4b and the specimen 6 is taken as an angle of reflection by a rear surface of the cantilever 5 of a laser light impinging thereon, and the amount of bending is maintained constant by adjusting the height so as to be the angle constant, it is then possible to control and maintain the distance between the tip of the probe 4b and the specimen 6 at an accuracy within 0.1 nm. Also, high-precision positioning control in planar directions can be achieved using a piezoelectric stage.

Mention is next made of an operation of the apparatus illustrated. Referring to FIG. 1, an infrared light 8 incident from below via a usual optical lens 7 into the solid immersion lens 2 is past a specimen 6 mounted on its base plane 3 and is focused on the antenna 4 where it is converted into a high-frequency electric current. Then, the spacing between the antenna 4 and the base plane 3 is so small that the dielectric constant which the infrared light feels is dielectric constant $\epsilon_s$ of the solid immersion lens 2. And then, high dielectric constant $\epsilon_s$ of the medium from which the infrared light 8 is incident into the antenna 4 increases the electromagnetic power of the infrared light 8, i.g., induces a large electromagnetic current in the antenna 4. To wit, coupling of an incident infrared light to an antenna in such a medium is made better in efficiency than in a free space (vacuum or air) by a factor of $(\epsilon_s/\epsilon_o)^{3/2}$ where $\epsilon_s$ and $\epsilon_o$ are dielectric constants of the medium and free space, respectively. For example, when the solid immersion lens and the specimen support table are composed of silicon ($\epsilon_s=12.8\ \epsilon_o$), gallium ($\epsilon_s=12.5\ \epsilon_o$), germanium ($\epsilon_s=16\ \epsilon_o$) or the like, the improvement in efficiency reaches several tens times over in the free space.

Also, where as shown in FIG. 2 the antenna 4 has a length that is one half of its effective wavelength there, the infrared light 8 is brought into geometrical resonance and coupled to the antenna 4 at an enhanced efficiency. As a result, the infrared light as indicated by the white arrows in the Figure induces a high-frequency electric current in the electric conductor 4a efficiently and the high-frequency electric current in turn forms a strong near-field localized at a portion 6a of the specimen that is adjacent to the tip apex of the probe 4b. Thus, the apparatus according to the present invention is capable of focusing or concentrating an incident infrared light 8 efficiently at a submicron area 6a of the specimen, thanks to two-step concentrating actions, namely by the high-dielectric-constant solid immersion lens focusing it at the antenna 4 and by the geometric resonance with the antenna 4 concentrating the near-field at the tip apex of the probe 4b. A light from the submicron area 6a can likewise be picked up efficiently. To wit, if a microfine area 6a of the specimen emits or scatters an infrared light 9, then the infrared light 9 can be picked up with the intermediary of its near-field coupling to the tip apex 4b and led with the intermediary of its geometric resonance in the antenna 4 into the high dielectric constant solid immersion lens 2, thereby permitting the infrared light 9 to be taken out as an outgoing light into the outside efficiently. Moreover, with the antenna 4 having its length one half of the effective wavelength $\lambda_{\mathit{eff}}$ of the light, moving to position the cantilever 5 within this length range does not affect the light condensing efficiency, permitting a scanning image over a length that is one half of the effective wavelength $\lambda_{\mathit{eff}}$ to be obtained. Also, scanning using a position control means as used in the AFM or the like allows a scanning image to be obtained at an extremely high resolution.

Figure 3:
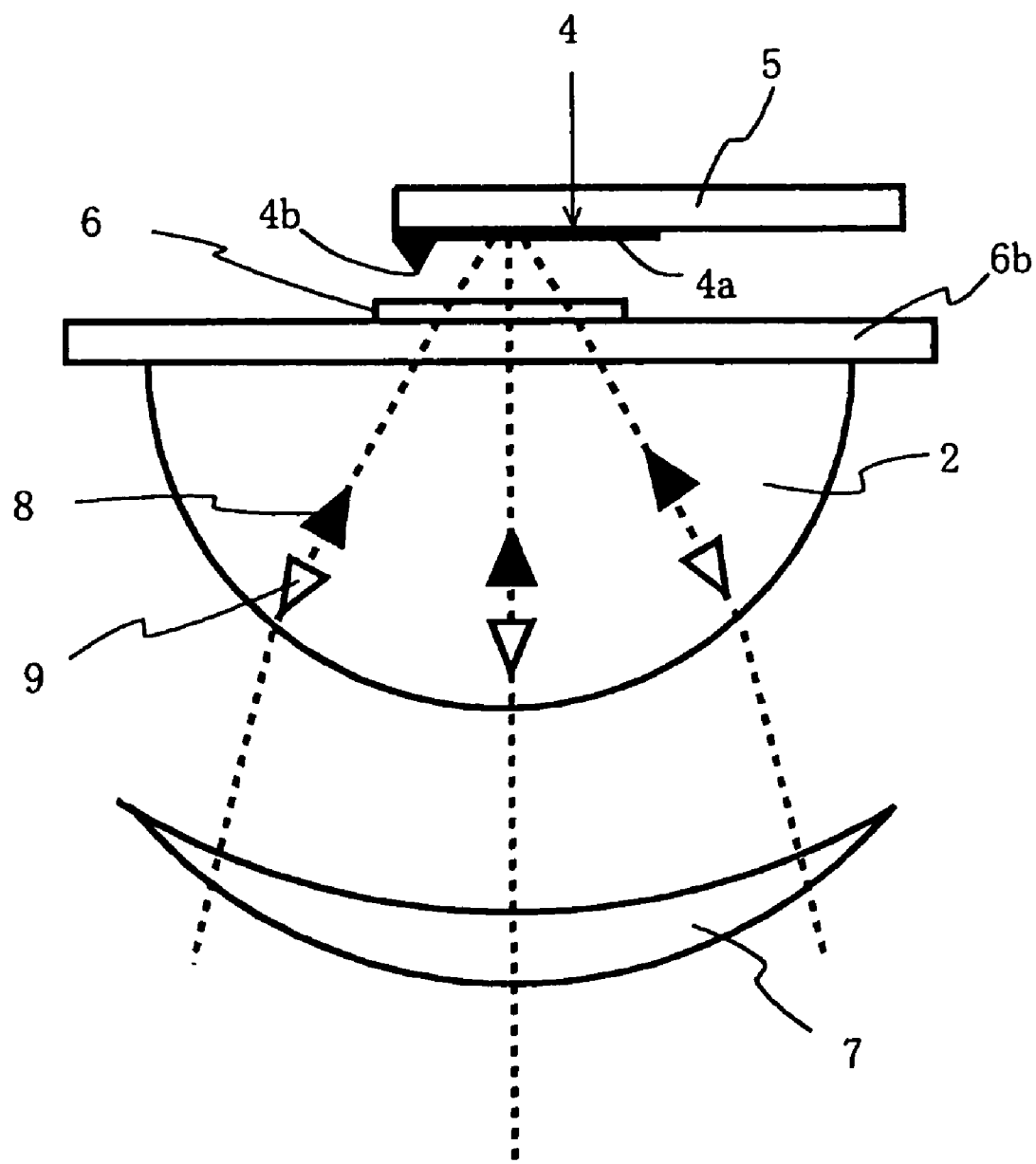
FIG. 3 is a schematic view illustrating a modification of the apparatus of FIG. 1.

FIG. 3 is a diagram illustrating the makeup of a modification of the first form of implementation of the present invention. Compared with the apparatus shown in FIG. 1, it differs in that there is provided a specimen support table 6b that supports or retains a specimen 6 thereon. The specimen support table 6b is composed of a material which is preferably identical to that of which the solid immersion lens 2 is composed but which if not identical should desirably be less in pick-up capability for wavelengths of the incident light or the outgoing light 9 and high in dielectric constant. In this modified apparatus, it is also important to adjust the solid immersion lens 2 and the specimen support table 6b in thickness so that the infrared light 8 past the solid immersion lens 2 and the specimen support table 6b is focused on the antenna conductor 4a.

An explanation is next given in respect of a second form of implementation of the present invention.

Figure 4:
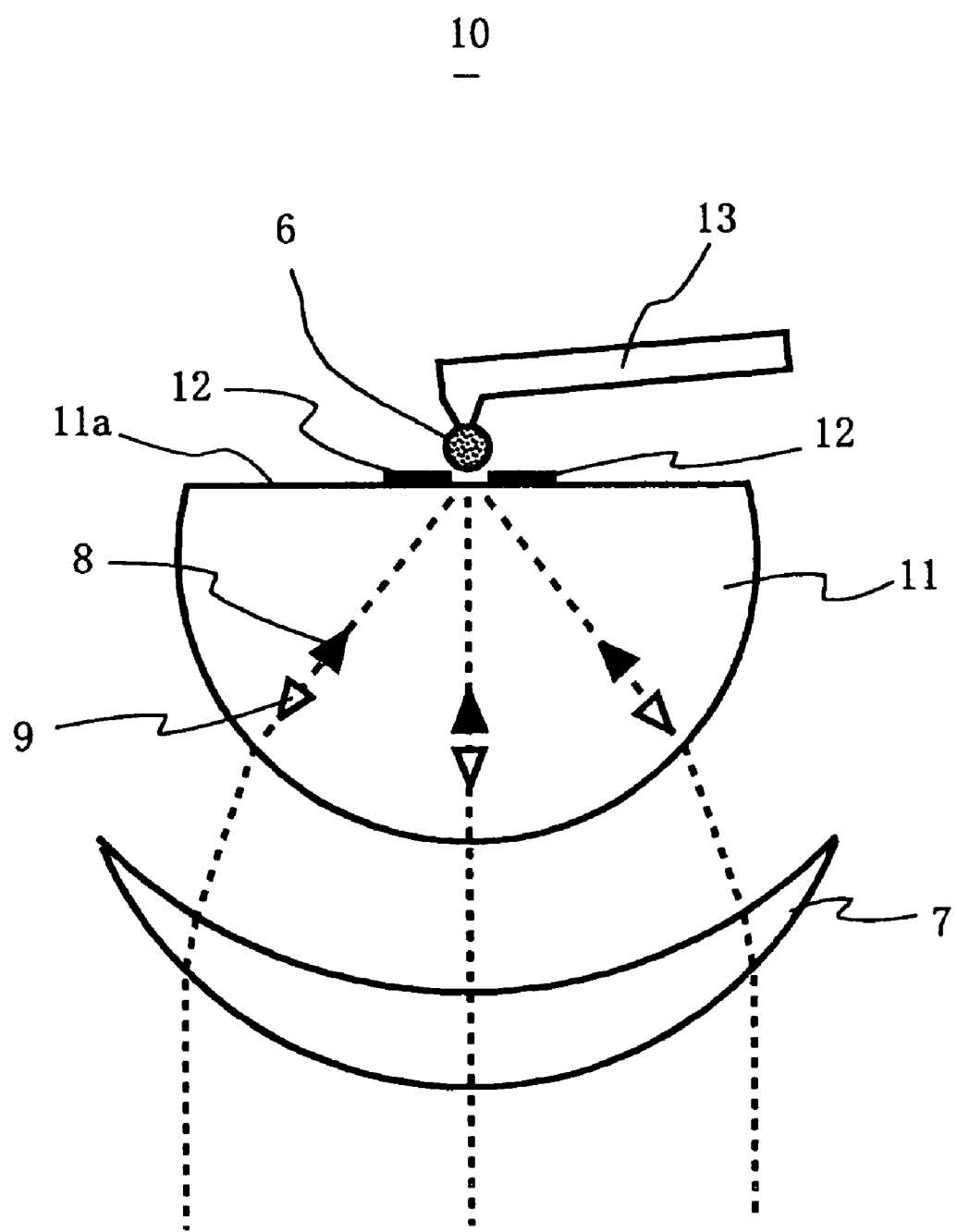
FIG. 4 is a schematic view illustrating an infrared light condensing apparatus that represents a second form of implementation of the present invention.

FIG. 4 is a diagram illustrating an infrared light condensing apparatus according to the second form of implementation of the present invention. This apparatus indicated by reference character 10 comprises a solid immersion lens 11, an antenna 12 formed on a base plane 11a of the solid immersion lens 11, a cantilever 13 disposed adjacent to the antenna 12 to carry a specimen, and a position control means (not shown) for controlling the position of the cantilever 13.

Figure 5:
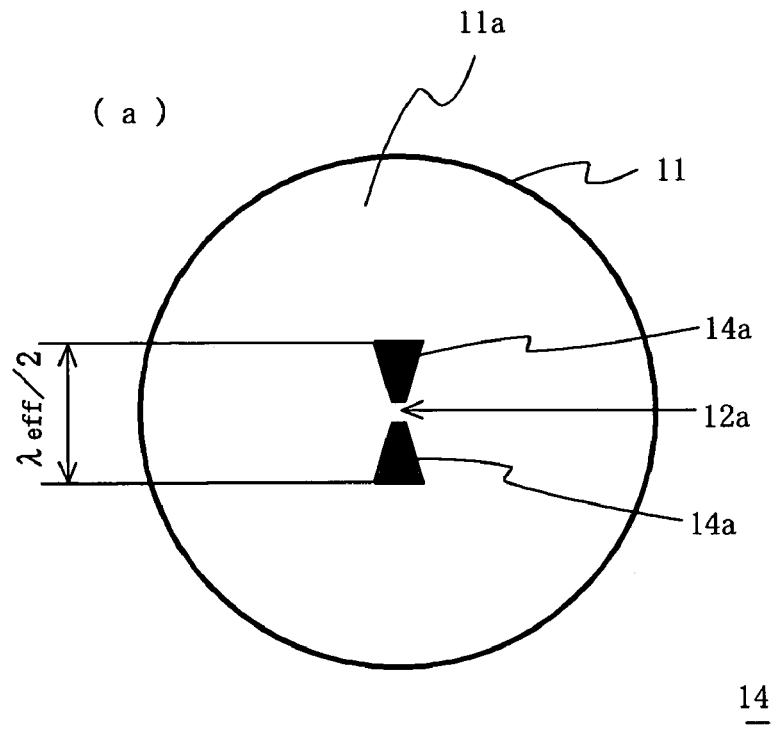
FIG. 5 shows at (a) and (b) the constructions of a planar dipole antenna and a planar slot antenna, respectively, that can be formed on a base plane of a solid immersion lens.
Figure 5:
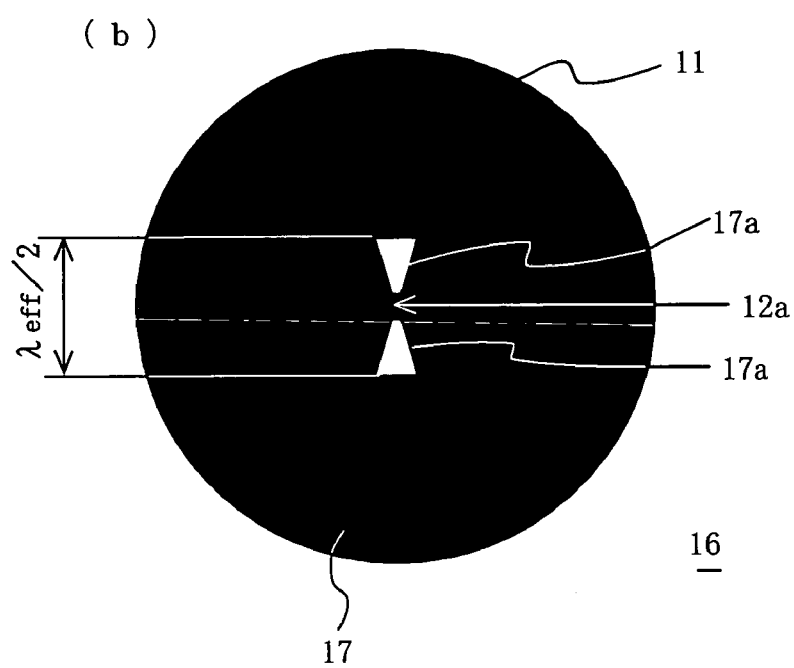

FIG. 5 shows at (a) and (b) the constructions of a planar dipole antenna 14 and a planar slot antenna 16, respectively, each of which is shown formed on the base plane 11a of the solid immersion lens 11. The planar dipole antenna 14 and the planar slot antenna 16 are each formed in the form of electrically conductive thin film at a focal position on the base plane 11a of the solid immersion lens 11. The planar dipole antenna 14 as shown in FIG. 5(a) is a bowtie antenna which is made of a pair of generally triangular electric conductors 14a whose apexes are opposed to each other across a small spacing 12a less than the diffraction limit of an incident or outgoing light, the bowtie antenna having a total length that is one half of an effective wavelength $\lambda_{eff}$ of the incident or outgoing light. The planar slot antenna 16 as shown in FIG. 5(b) is a bowtie antenna which is made of an electric conductor 17 in which are formed a pair of generally triangular windows 17a and 17b whose apexes are opposed to each other across a small spacing 12a less than the diffraction limit of an incident or outgoing light, the bowtie antenna having a total length that is one half of an effective wavelength $\lambda_{eff}$ of the incident or outgoing light.

Mention is next made of an operation of the apparatus.

Referring to FIG. 4, an infrared light incident from below via a usual optical lens 7 into the solid immersion lens 11 is condensed at the antenna 12 by the usual geometrical-optical light condensing action of the solid immersion lens. In the antenna 12 it is then converted into a high-frequency electric current while causing a near-field to develop and concentrate at a microfine area 12a in the antenna 12. And then, as in the first apparatus mentioned above, high dielectric constant $\in_s$ of the medium from which the infrared light 8 is incident into the antenna 12 increases the electromagnetic power of the infrared light 8, i.g., induces a large electromagnetic current in the antenna 12.

Also, with the bowtie antenna 14, 16 having its total length one half of the effective wavelength $\lambda_{eff}$ as shown in FIG. 5, the condensed infrared light 8 is caused to geometrically resonate therewith, thereby concentrating the near-field (electric-field component) of the infrared light 8 at the microfine area 12a efficiently. The near-field formed localized efficiently at the microfine area 12a in the antenna 12 forms a near-field at a portion of the specimen 6 that is immediately adjacent thereto. The specimen 6 mounted on the cantilever 13 is moved controllably by the position control means as in the first apparatus mentioned above to successively change its position at which the near-field is created, thereby permitting its scanning.

The resolution in this apparatus is determined by the size of the microfine area 12a located at the center of the bowtie antenna 14, 16. The microfine area 12a can be varied in size in terms of its one side length from 10 microns to 0.05 micron depending on a particular wavelength of the infrared light and a particular space resolution required in measurement. The bowtie antenna, which can be readily made up, e.g., by forming a pattern metal film on the base plane of a solid immersion lens, makes it possible to build up an apparatus with a resolution optimal to a particular specimen to be measured and a particular purpose of measurement.

Likewise, a near-field from a microfine area 12a can also be taken out efficiently in the form of a propagating wave. To wit, if a portion of the specimen 6 that is immediately adjacent to the microfine area 12a emits or scatters an infrared light 9, then an oscillating current is induced in the bowtie antenna 14, 16 with the intermediary of its near-field coupling to the microfine area 12a and is caused to geometrically resonate with the bow-tie antenna 14, 16 to allow the infrared light 9 to be emitted in the form of a propagating wave into the solid immersion lens 1 made up of the high dielectric constant medium and the emitted infrared light 9 to be taken out of the solid immersion lens 11 efficiently into the outside. Also, position control using the cantilever 13 allows obtaining a scan image at a resolution of submicron.

It should be noted here that the planar dipole antenna and the planar slot antenna shown in FIG. 5(a) and FIG. 5(b) may be modified in a variety of ways depending on the nature and shape of a specimen to be measured. It is only essential that the size of the required near-field area be definitely established and that according to the size established the antenna be designed so that its geometry be adequate to cause an incident light to create geometrical resonance with the antenna and their impedance matching conditions are met. These requirements in conjunction with the known theory relating to an antenna on a medium allows an antenna of this type to be designed optimally according to a particular specimen to be actually measured in practice and a particular wavelength of the infrared light used. See literature: "Infrared and Millimeter Waves, Volume 10", Millimeter Components and Techniques, Part II, Chapter 1 (1983), ed. by Academic Press Inc.

An explanation is next given in respect of a third form of implementation of the present invention.

Figure 6:
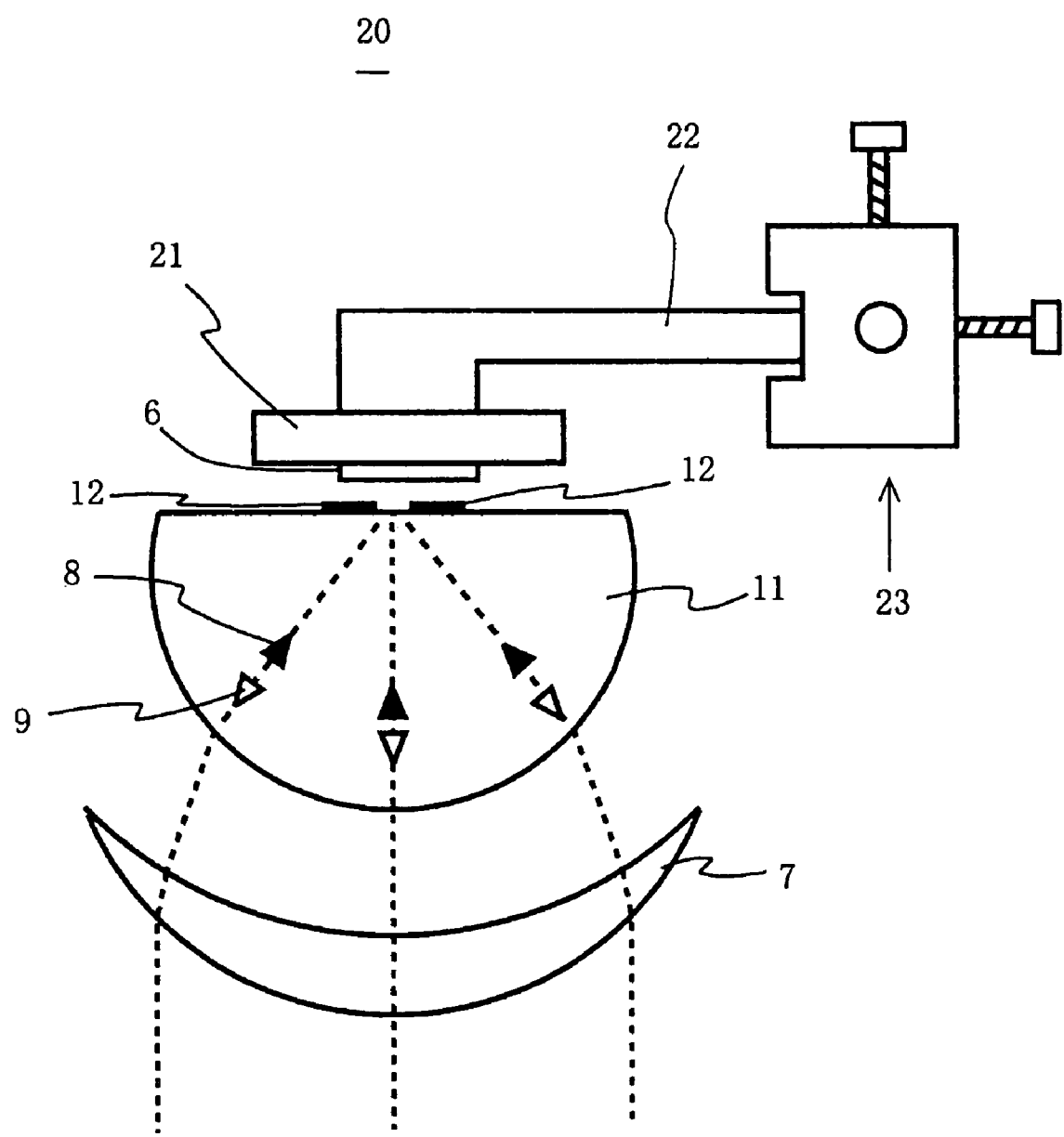
FIG. 6 is a schematic view illustrating an infrared light condensing apparatus that represents a third form of implementation of the present invention.

FIG. 6 is a diagram illustrating an infrared light condensing apparatus according to the third form of implementation of the present invention. This third apparatus, designated by reference character 20, of the invention is identical in makeup to the apparatus 10 in FIG. 4 except that the cantilever 13 used to retain a specimen is replaced with a specimen support 21 for supporting a specimen and an arm 22 for supporting the specimen support 21 and the position control means for controlling the position of the arm 22 comprises a triaxial XYZ precision mechanical stage 23. Alternatively, it is possible, though not shown, to replace the cantilever 5 for supporting the antenna 4 in the apparatus shown in FIG. 1 with an arm and to use a triaxial XYZ precision mechanical stage for controlling the position of this arm.

Mention is next made of a specific example of the present invention.

Figure 7:
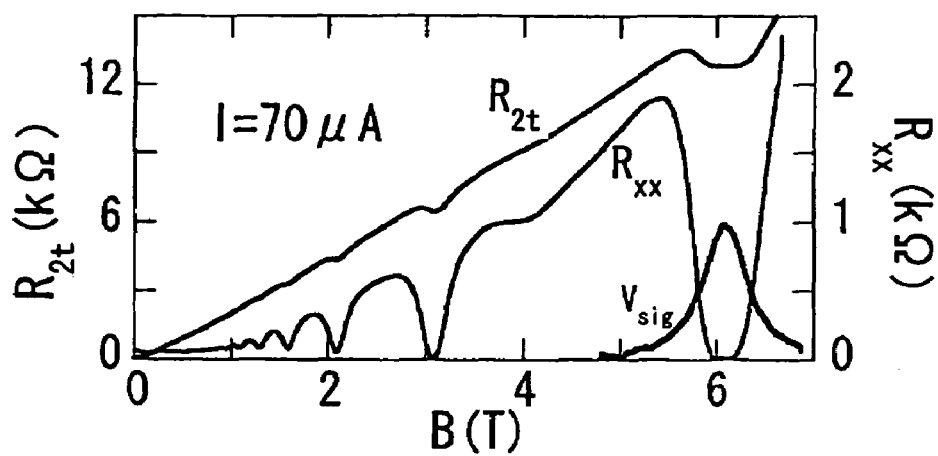
FIG. 7 shows results of measurement of an edge current based on the quantum Hall effect according to an apparatus of the present invention wherein (a) is a graph illustrating the quantum Hall effect for a measured specimen and (b) shows distributions of the measured edge current.
Figure 7:
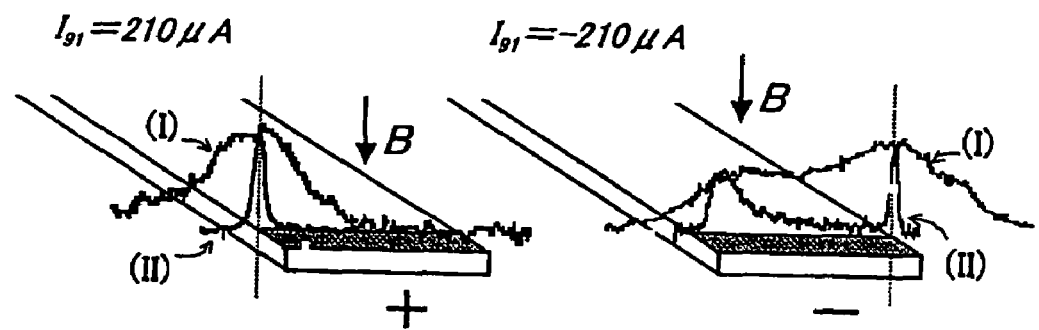
Figure 8:
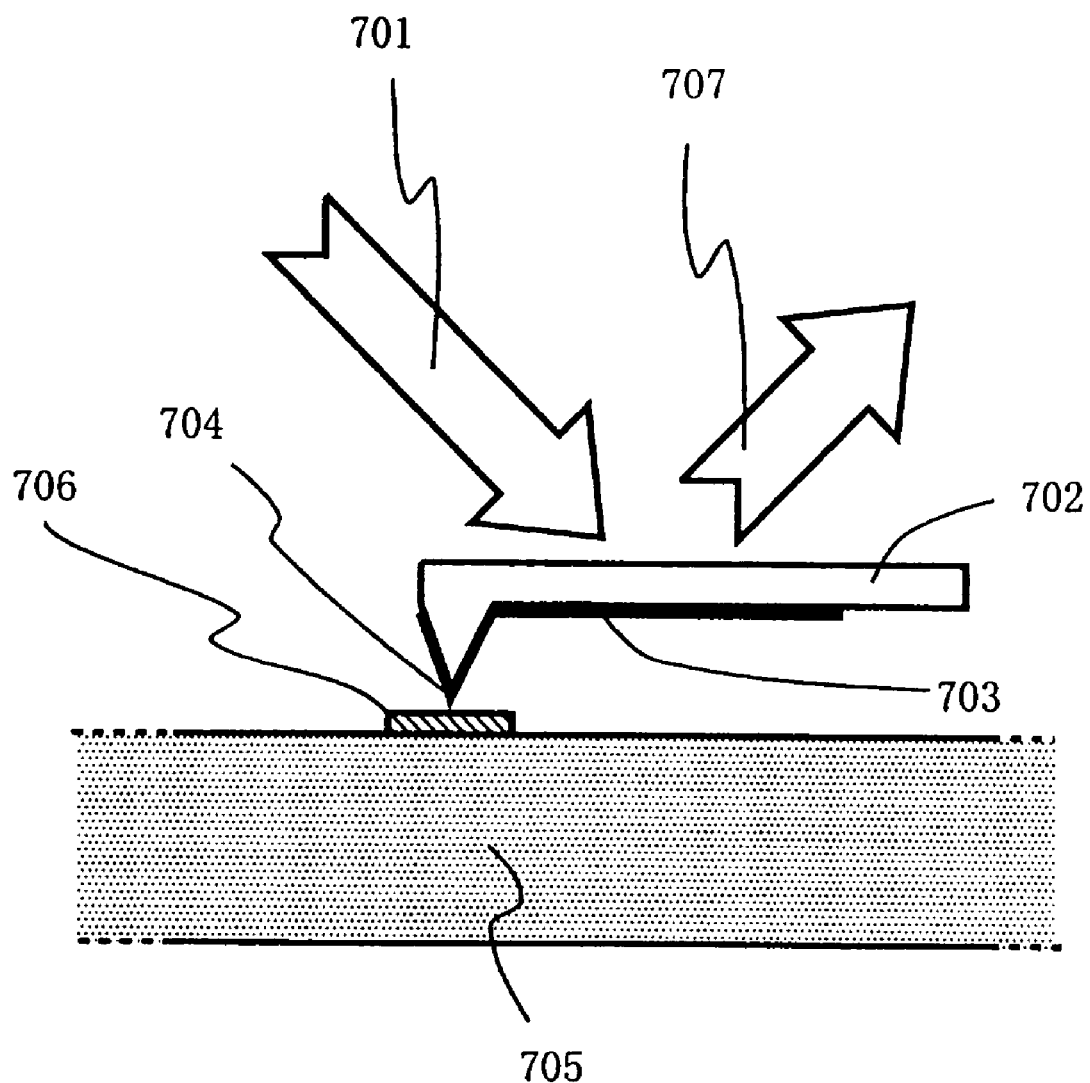
FIG. 8 is a makeup diagram of a near-field light condensing apparatus according to the prior art.
Figure 9:
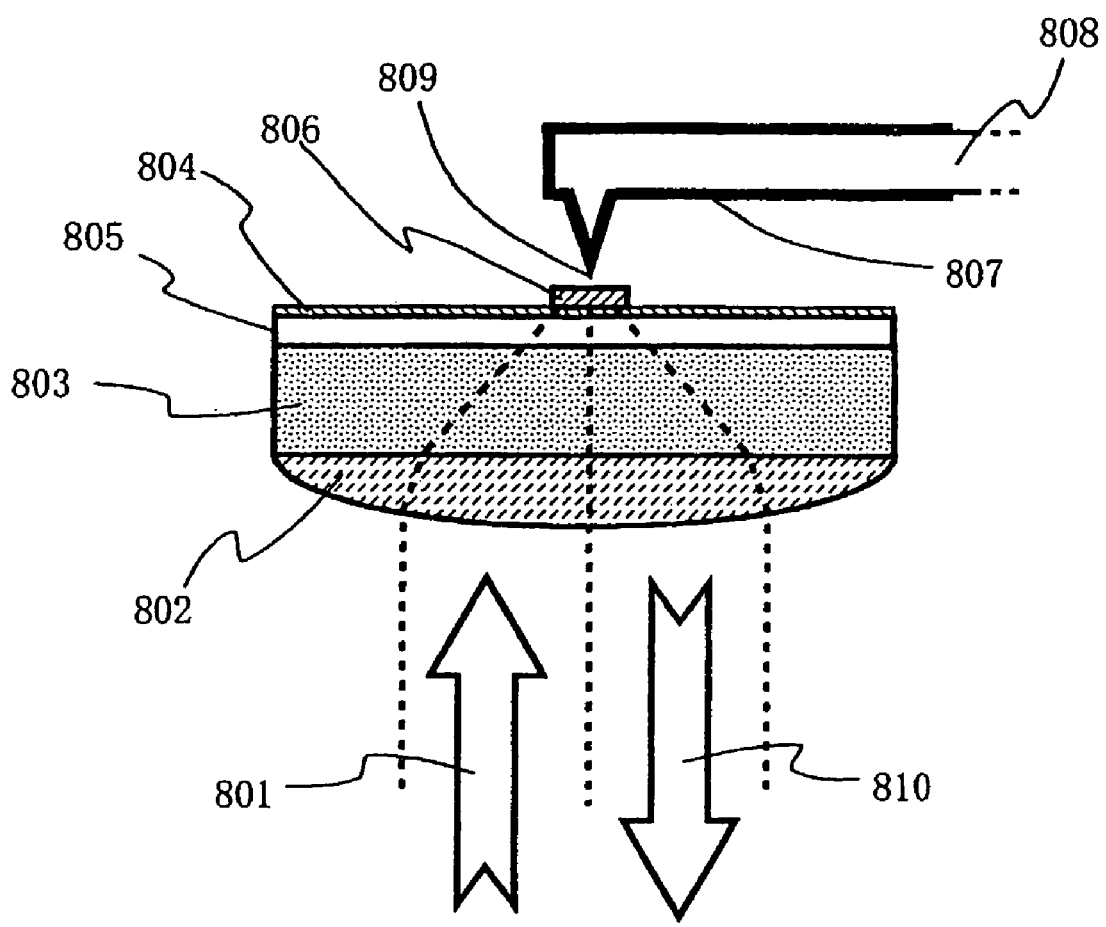
FIG. 9 is a makeup diagram of a conventional light condensing apparatus for use in Raman scattering.
Figure 10:
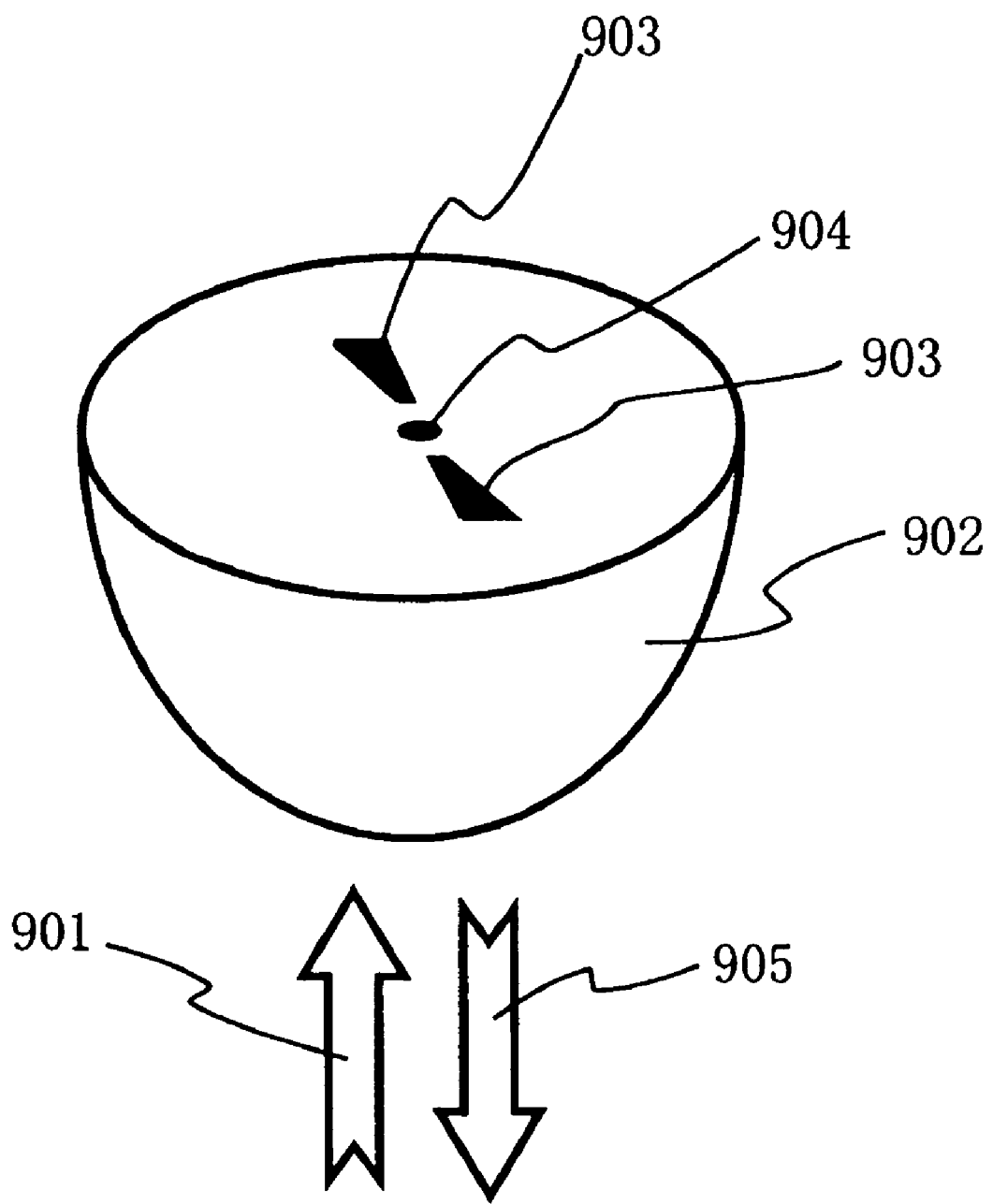
FIG. 10 is a makeup diagram of a conventional light condensing apparatus for use in a far-infrared absorber.

This specific example used an apparatus constructed as shown in FIG. 6. The apparatus was made using a solid immersion lens composed of silicon crystal. The solid immersion lens had a radius of curvature of 1.4 mm and a thickness in its center axis of 1.98 mm. FIG. 7 shows results of measurement based on the quantum Hall effect according to an apparatus of the present invention wherein (a) is a graph illustrating the quantum Hall effect for a measured specimen and (b) shows distributions of the measured far-infrared light. The measured specimen is a two-dimensional electron system in a substrate of aluminum-gallium-arsenic/gallium-arsenic heterostructure. The substrate had a thickness of 0.5 mm and the two-dimensional electron system existed at a depth of 0.1 micron from the substrate surface. The specimen was prepared as a Hall bar device of 4 mm long and 1.5 mm wide retaining the two-dimensional electron system. The Hall bar specimen exhibited the quantum Hall effect under a strong magnetic field at a liquid helium temperature as indicated by the graph for resistances in FIG. 7(a).

The Hall bar specimen retained on the substrate was held by the arm 22 in the triaxial XYZ precision mechanical stage 23. While the specimen was being swept along the surface of the solid immersion lens, the intensity distribution of extremely weak far-infrared light emissions from the specimen successively from its edge was picked up. The results of measurement are shown in FIG. 7(b). The measurement was made in a magnetic field of about 6 T and the far-infrared light had a vacuum wavelength of 125 μm. In the graphs of FIG. 7(b) the curves (II) represent results of measurement according to the apparatus of the present invention whereas the curves (I) represent results of measurement according to the prior art method.

Comparison of the results of measurement according to the present invention with those according to the prior art indicates, first, that an improvement by a factor 20 is obtained in the intensity of far-infrared light observed by the present invention over the prior art (note, however, that in FIG. 7(b) the light intensity maximum values of both cases are shown to apparently coincide in order to show a difference between them in spatial resolution to be identified below). Secondly, it is indicated as is apparent from comparison of (I) and (II) in FIG. 7(b) that the spatial resolution is improved remarkably from about 0.5 mm to about 0.06 mm.

According to an apparatus of the present invention in which a light is condensed through a solid immersion lens made of a medium that is high in dielectric constant and a near-field is taken out via such a solid immersion lens, it is seen that marked improvements in both sensitivity and resolution are attained over the prior art. In the specific example above, however, the solid immersion lens had not an antenna formed on its surface and for this reason, a resolution of submicron is not shown. However, the effect achieved when an antenna is formed on such a surface should be apparent from specific examples of the conventional pick-up. See literature: "Infrared and Millimeter Waves, Volume 10", Millimeter Components and Techniques, Part II, Chapter 1 (1983), ed. by Academic Press Inc.

INDUSTRIAL APPLICABILITY

As will be appreciated from the foregoing description, the present invention designed to cause an infrared light to be condensed via a medium of high index of refraction and upon being excited into geometrical resonance makes it possible for an infrared light of several tens micros or more in wavelength to be focused as a near-field at a very small area of submicron or less at an extremely enhanced efficiency and also for a near-field from a very small area of submicron or less to be taken out at a high efficiency. Further, given the positioning control capability with a cantilever at high precision, the present invention makes it possible to obtain a scanning image at a resolution within submicron.

Accordingly, without necessitating an incident light source particularly high in intensity, it is made possible to provide an optical instrument, such as an infrared microscope, a far-infrared microscope, a microwave microscope, a Raman spectrographic microscope and an infrared fluorescence microscope, having a resolution limit less than the diffraction limit of a light used and at the same time permitting a scanning image to be obtained.

The invention claimed is:

1. An infrared light condensing apparatus, comprising:
    a solid immersion lens for accepting an incident light or emitting an outgoing light, said solid immersion lens having a base plane on which a specimen is disposed in direct contact with the solid immersion lens;
    an antenna comprising an electrically conductive material, the antenna having a probe disposed away from said base plane of said solid immersion lens at a distance not more than ¼ of an effective wavelength of the light;
    a holder means for retaining said antenna; and
    a position control means for controlling a position of a tip of said probe by means of said holder means,
    wherein operating said position control means allows:
    the incident light to concentrate as a near-field at a desired position of the specimen on the base plane of said solid immersion lens or
    a near-field from a desired position of the specimen to be converted into a propagating wave corresponding thereto and then the propagating wave to be emitted as said outgoing light from said solid immersion lens.

2. An infrared light condensing apparatus as set forth in claim 1, wherein said solid immersion lens comprises a medium that is low in absorption coefficient and large in dielectric constant for wavelengths of said incident or outgoing light.

3. An infrared light condensing apparatus as set forth in claim 1 or 2, wherein said antenna comprises an electric conductor having a length that is one half of the effective wavelength of said incident or outgoing light
    to condense the incident light upon causing it to geometrically resonate or
    to pick up a near-field from said specimen in a region of the pointed tip of said probe upon causing it to geometrically resonate and then to emit it as a wave propagating in the medium of said solid immersion lens.

4. An infrared light condensing apparatus as set forth in claim 1 or 2, wherein the tip of said probe is a sharply pointed end of a rod-like electric conductor having a radius of curvature less than a diffraction limit of said incident or outgoing light and is configured to project from said electric conductor towards said specimen
    to cause the geometrically resonating incident light condensed on said antenna to concentrate as a near-field at said probe tip or
    to take out a near-field from a surface of said specimen.

5. An infrared light condensing apparatus as set forth in claim 1 or 2, wherein said holder means comprises an arm and said position control means comprises a triaxial XYZ mechanical stage.

6. An infrared light condensing apparatus as set forth in claim 1 or 2, wherein said holder means comprises a cantilever having a rear face reflecting an incident laser light and said position control means is adapted to respond to a change in angle of reflection of the laser light at the cantilever rear face for controlling the distance between said probe tip and the surface of said specimen.

7. An infrared light condensing apparatus as set forth in claim 1, wherein said holder means is a cantilever.

8. An infrared light condensing apparatus as set forth in claim 7, wherein said cantilever is scanned by said position control means.

9. An infrared light condensing apparatus as set forth in claim 7, wherein said position control means controls the distance between said probe tip and the surface of said specimen, responding to a change in angle of reflection of the laser light at the rear face of said cantilever.

* * * * *